United States Patent [19]

Kiss

[11] 4,220,826
[45] Sep. 2, 1980

[54] RINGING GENERATOR

[75] Inventor: William B. Kiss, Ottawa, Canada

[73] Assignee: Mitel Corporation, Kanata, Canada

[21] Appl. No.: 30,196

[22] Filed: Apr. 16, 1979

[30] Foreign Application Priority Data

Dec. 11, 1978 [CA] Canada .................................. 317680

[51] Int. Cl.$^2$ ............................................ H04M 5/00
[52] U.S. Cl. .............................. 179/51 AA; 179/84 R; 179/18 HB
[58] Field of Search .......... 179/51 AA, 18 AB, 84 R, 179/84 H, 18 H

[56] References Cited

U.S. PATENT DOCUMENTS

| 3,092,691 | 6/1963 | Burns et al. | 179/84 R |
|---|---|---|---|
| 3,456,083 | 7/1969 | Van Der Veen | 179/84 R |
| 3,492,436 | 1/1970 | Feiner et al. | 179/18 HB |
| 3,653,018 | 3/1972 | Budrys | 179/84 R |
| 3,720,793 | 3/1973 | Hofman | 179/84 R |
| 4,001,515 | 1/1977 | Zorzy | 179/18 HB |
| 4,001,516 | 1/1977 | Weisigk et al. | 179/84 R |
| 4,145,577 | 3/1979 | Kojima et al. | 179/84 R |
| 4,156,150 | 5/1979 | Harrigan et al. | 179/84 R |

Primary Examiner—Gerald L. Brigance
Attorney, Agent, or Firm—Alan H. Levine

[57] ABSTRACT

A ringing signal supply for supplying ringing current to a telephone line with high efficiency and minimum distortion. As the ringing current demand of a load increases, distortion of the output signal is produced which causes an error signal to be generated after comparison of the output signal waveshape with a reference waveshape. The error signal is used to change the duty cycle of a pulse signal from which the output ringing signal is produced, thereby maintaining the proper output signal waveshape.

12 Claims, 4 Drawing Figures

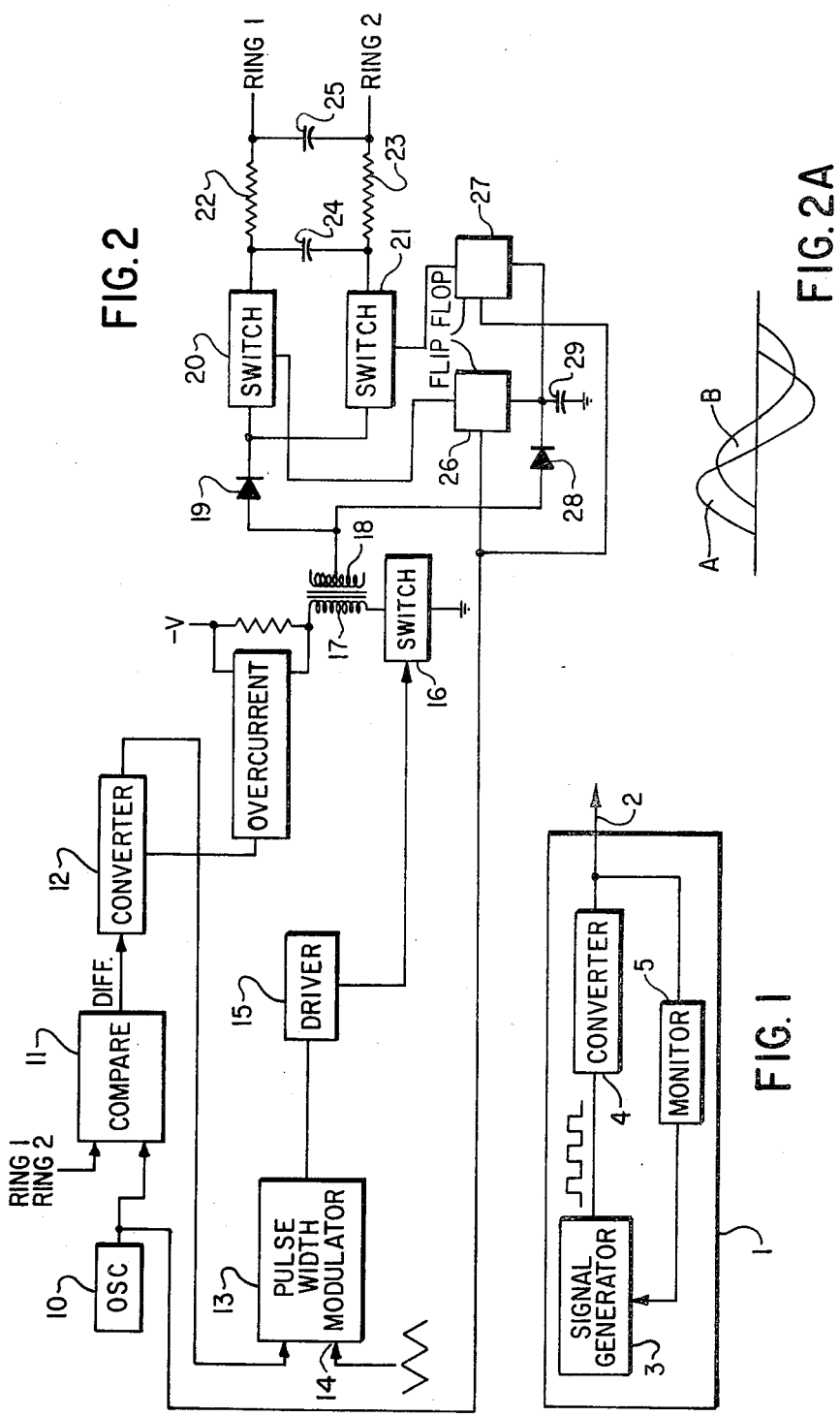

RINGING GENERATOR

BACKGROUND OF THE INVENTION

This invention relates to a ringing signal supply which is particularly useful in the telephone industry.

Telephone systems in North America have standardized ringing frequencies at 20 hertz for normal ringing, the ringing signals having RMS amplitude of about 90 volts. Due to the relatively low impedance of telephone lines to which the ringing signals are normally applied, the amount of power required for supply by a typical telephone central office ringing generator is relatively high.

The ringing generators are normally constantly operating, with the output signals switched to various telephone lines as ringing is required. Thus the amount of ringing current to be supplied is constantly varying due to the different traffic loads continuously experienced. As a result, distortion of the ringing signal waveform is sometimes experienced due to high current demand, and the efficiency of the ringing generator has generally been relatively low since it normally is designed to supply a constant high output current.

The present invention is a ringing signal generator which is believed to have improved efficiency, since it supplies only that current demanded by its load, as the demand changes. Further, the signal generator constantly monitors the output signal waveform and self-corrects so as to provide a low distortion output signal at both low and high load current levels.

The circuit utilizes a combination of pulse and analog circuit techniques, in which the amount of output current supplied is dependent on the pulse width of a signal which produces the output signal. Therefore the amount of energy for producing the output signal is constantly under control with minimum energy wastage. Should distortion of the output signal become evident due to the draw in the load of additional signal current, this distortion causes automatic adjustment of the pulse width, increasing the available energy and therefore the available output signal current. The increase in energy corrects the aforenoted distortion.

The efficiency of the ringing generator thus remains high; yet the waveform of the output signal remains relatively constant and nearly ideal, even with various load currents.

SUMMARY OF THE INVENTION

To obtain these advantages the inventive ringing signal supply is comprised of means for providing a variable pulse width signal, means for converting the variable pulse width signal to an output signal of the ringing signal supply, means for monitoring the output signal of the ringing signal supply for determining a variance of its waveshape from a predetermined waveshape, and means for varying the width of the pulse waveform of the variable pulse width signal in response to the variance so as to render the output signal to the form of the predetermined waveshape.

More specifically, the invention is a ringing signal supply comprising a ringing frequency signal generator, a comparison circuit connected to the output of the signal generator, including means for receiving a further signal representative of an output signal of the ringing signal supply, for comparing an output signal of the signal generator with the output signal of the ringing voltage supply and for producing an error signal related to the difference therebetween. A pulse width modulator circuit is included having means for receiving a high frequency triangular envelope signal and a smoothed representation of the error signal and for pulse width modulating the triangular envelope signal therewith, means for supplying current through a transformer at a rate corresponding to the modulated triangular envelope signal, and means for producing the output signal of the ringing signal supply from the transformer at the ringing frequency.

INTRODUCTION TO THE DRAWINGS

A better understanding of the invention will be obtained by reference to the detailed description below, and to the following drawings, in which:

FIG. 1 is a block diagram of the invention in its most general form,

FIG. 2 is a more detailed block diagram of the invention, and

Figure 3:
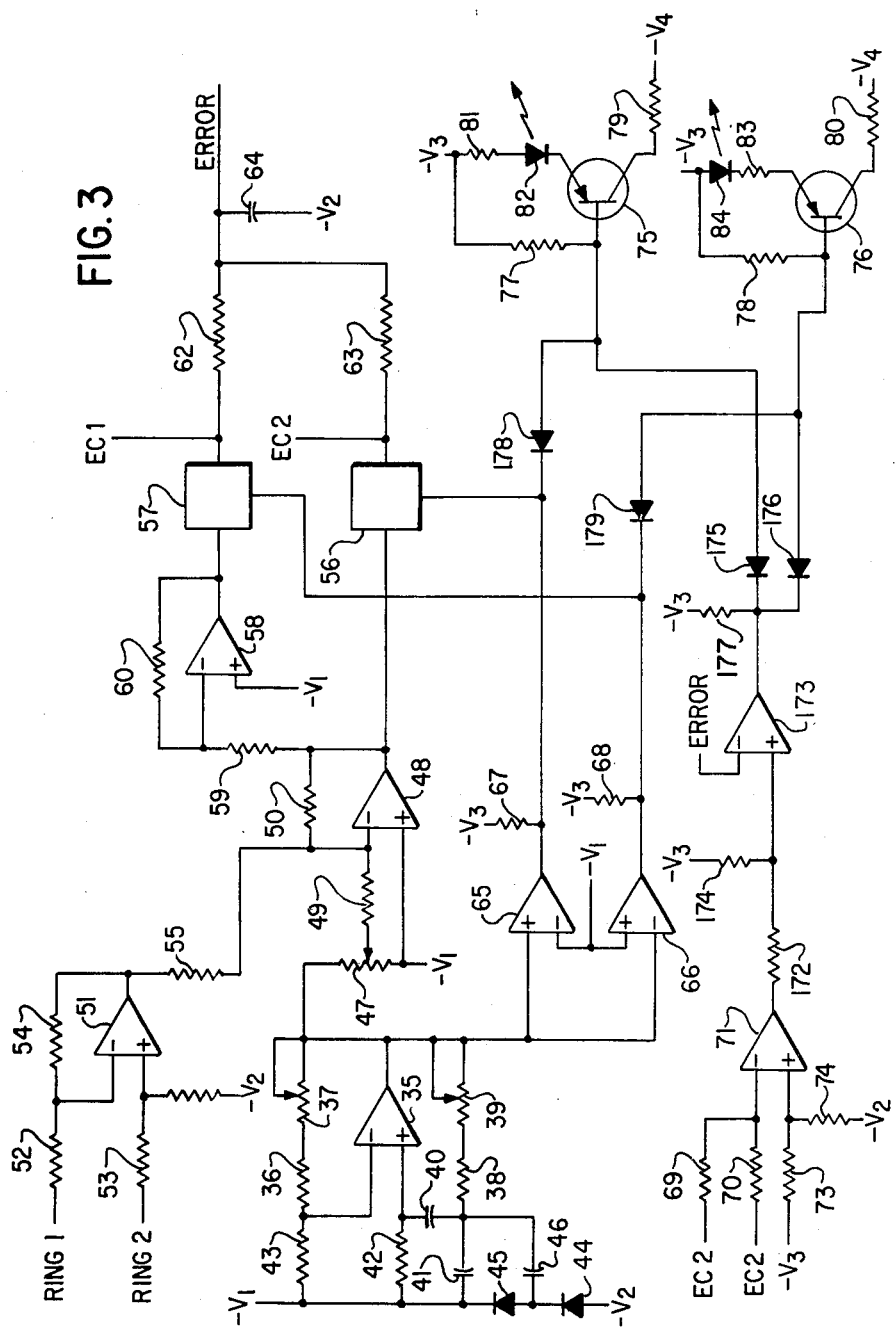
Figure 4:
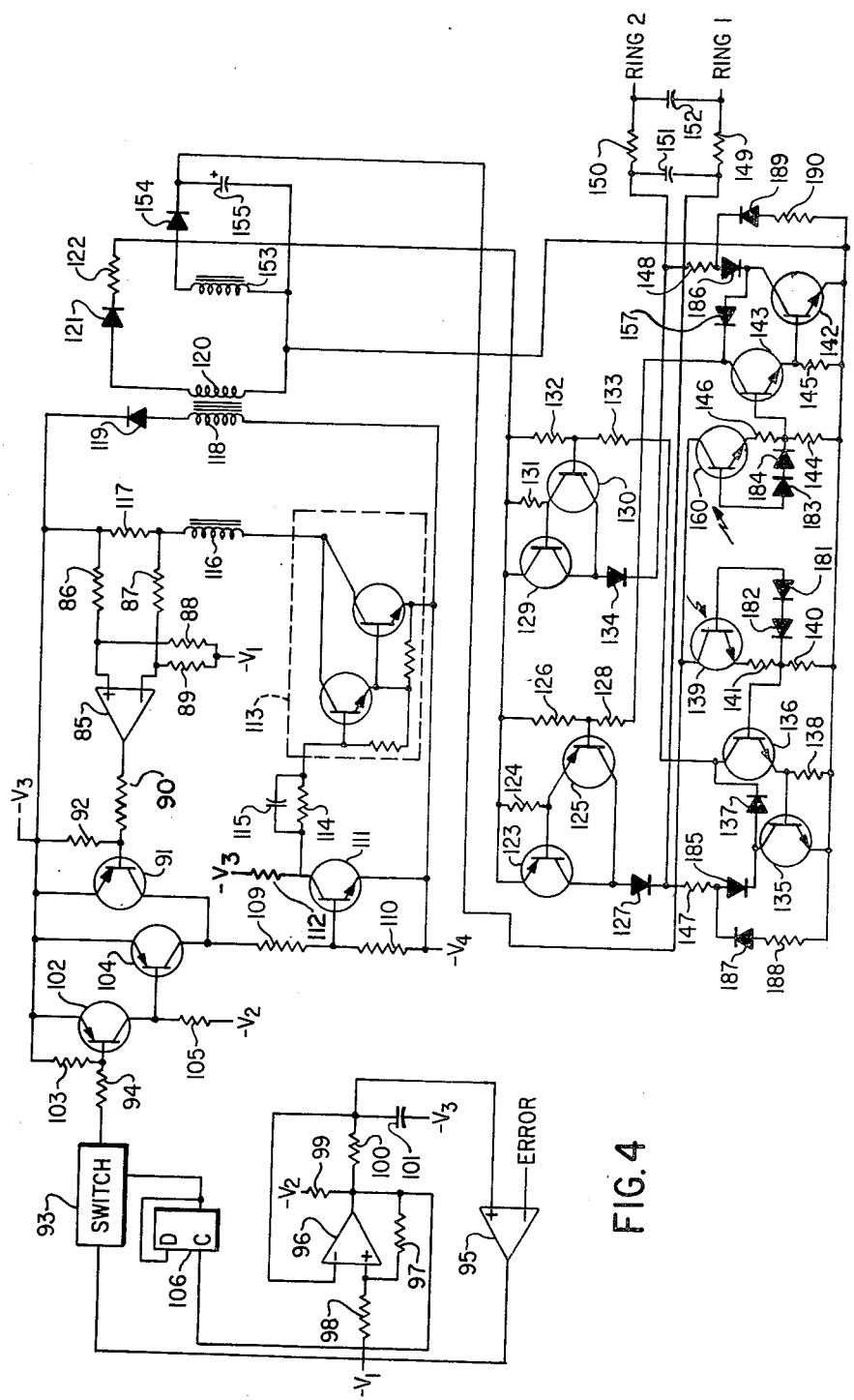

FIGS. 3 and 4 when placed together form a detailed schematic of the invention.

Turning first to FIG. 1, a ringing signal supply 1 is shown having a terminal 2 for providing an output signal therefrom.

DETAILED DESCRIPTION OF THE INVENTION

The ringing signal supply 1 contains a pulse means for providing a variable width signal, for example from signal generator 3. This generator includes means for providing a variable pulse width signal. Its output is connected to means for converting the variable pulse width signal to an output signal of the ringing signal supply 4 at ringing frequency, and preferably sine waveshape.

Monitoring means 5 monitors the output signal of the ringing signal supply and determines any variance of its waveshape from a predetermined waveshape. The generator 3 further contains means for varying the width of the pulses of the pulse waveform in response to the variance so as to render the output signal of the ringing signal supply to the form of the predetermined waveshape after conversion by the converting means 4.

The pulse waveform preferably is a high frequency (say, about 20 KHz) signal with a low duty cycle having a relatively small amount of energy for small amounts of current draw by the load. This is converted by the converting means to a standard form of ringing signal waveform, a sine wave of 90 volts RMS at 20 hertz.

In the event load current is drawn in excess of the energy supplied by the pulse waveform, distortion of the output signal of the ringing signal supply occurs. The output signal, being compared continuously with a standard waveshape in the monitoring means 5, provides a difference signal as its output which is applied to the signal generator 3 as an error signal. This error signal is used by the signal generator 3 to increase the width of the pulses produced to increase the amount of energy during certain ones or all of the pulses to correct the waveshape. After translation to a ringing signal in converter 4, additional current is supplied to a load connected to the output signal terminal 2, and the output waveshape returns to one of low distortion.

The aforenoted circuit thus provides to the load the amount of signal current only as such current is required by the load, and therefore operates with relatively high overall efficiency since excess current does not have to be dissipated. At the same time, distortion of the output signal is automatically corrected.

FIG. 2 depicts the invention in more detailed block diagram. An oscillator 10 produces an output signal at the ringing frequency. A comparing circuit 11 has one input connected to the output of oscillator 10, and a second input to which the output signal RING 1 and RING 2 of the ringing signal supply is applied.

The output of the comparing circuit 11 is connected to a converting circuit 12 for converting the output signal of the comparing circuit to a varying direct current error signal.

The error signal is applied to a pulse width modulator circuit 13, having a second input 14 to which a high frequency (such as 20 kilohertz) triangular wave signal is applied.

The output of the pulse width modulator 13 is connected to a current driver 15 which has its output connected to a current switch 16 such as a switching Darlington circuit. This circuit is connected in series with the primary 17 of an output transformer.

The secondary 18 of the transformer is connected through a diode 19 to a pair of current switches 20 and 21, which are respectively connected to output leads RING 1 and RING 2, preferably with resistors 22 and 23 in series therewith as well as capacitors 24 and 25 connected between the leads on opposite sides of the resistors. The latter four components act as a low pass filter preventing switching transient noise from reaching the telephone line.

A bistable flip flop having a pair of sections 26 and 27 is connected to the current switches 20 and 21 for operation thereof. The flip flop sections 26 and 27 are connected to the output of oscillator 10 for operation therefrom.

Also connected to the transformer is a rectifier and filter circuit comprising rectifier diode 28 and capacitor 29, connected respectively in series and parallel with the transformer in a well-known manner. The junction of rectifier diode 28 and capacitor 29 is connected to flip flop sections 26 and 27 for supplying operating current thereto.

In operation, the oscillator 10 provides a 20 hertz output frequency sine wave signal. This is applied to one input of the comparing circuit 11. Also applied to the second input of comparing circuit 11 is a sample of the output signal of the ringing signal supply. These signals are compared and the resulting difference signal is applied to the converting circuit 12 for conversion to a varying d.c. error signal.

A relatively high frequency (say 20 kilohertz) triangular waveform signal is applied to the second input of the high gain pulse width modulator 13, while the varying d.c. error signal is applied to the first input. The error signal amplitude modulates the triangular wave signal, varying the duty cycle of the now approximately square wave pulse signal. This is amplified in driver 15, and the resulting square wave signal is applied to the gate of current switch 16 to switch it on during each pulse periods. The resulting current passing through current switch 16 also passes through the primary 17 of the output transformer. This is induced in secondary winding 18. The resulting current is rectified in diode 19. Due to the varying pulse width and rectification in diode 19, the resulting signal waveshape is of the form of a full-wave rectified by unfiltered sine wave.

This signal is applied in parallel to current switches 20 and 21, which are individually connected to the output ringing leads RING 1 and RING 2 through output resistors 22 and 23. The signals applied thereto are of opposite polarity, converting the aforenoted full-wave rectified sine wave to a sine wave, as follows.

The current switches 20 and 21 are individually enabled by separate sections 26 and 27 of a bistable flip flop. These sections are alternately operated from oscillator 10 in synchronization with the original oscillator frequency. Accordingly, for the first half cycle, the RING 2 lead is rendered as a ground rail in switch 21 while the RING 1 lead varies in amplitude with the output signal. During the second half cycle, the opposite occurs and the RING 1 lead is rendered as a ground rail in switch 20 while the RING 2 lead varies in amplitude with the signal. The switching of the signal carrying lead and the ground lead occurs in current switches 20 and 21 under control of sections 26 and 27 of the bistable flip flop.

D.C. operating current for the flip flop is obtained across capacitor 29 through diode 28 which rectifies a portion of the signal in secondary 18. However, it should be noted that it is preferred that a tertiary winding be used for this auxillary power supply.

The input signal from RING 1 and RING 2 leads is applied to the comparing circuit 11 as noted earlier. Should excess current be drawn, the output signal is modified in waveshape as a result of the excess current draw. Accordingly, a difference signal is obtained as between the waveshape from oscillator 10 and the output signal, and the difference, converted to varying d.c., modulates the triangular wave signal. The duty cycle of each squave wave pulse of the modulated signal is thus increased, increasing the relative energy contained in the signal. Thus the amount of energy delivered to the transformer and, as a result, to the ring leads is increased, thus restoring the waveshape of the output signal and delivering just sufficient current to satisfy the requirement of the load.

While the above has described the operation of the circuit in general, it has been found that the reactive ringer components cause a ringing current lag in the telephone line. Thus the sine wave ideal signal (see FIG. 2A) lags by an amount depending on the number of ringers being fed. It is preferred to feed current to the RING 1 and RING 2 leads during the period noted as A in FIG. 2A, and draw energy out of the latter leads during the period noted as B. This is effected by short circuiting the RING 1 and RING 2 leads during the B period by closing both of switches 20 and 21.

Turning now to FIG. 3, a detailed schematic of the preferred embodiment of the invention, a sine wave oscillator of well-known construction is shown. The oscillator is comprised of operational amplifier 35, having feedback resistors 36 and 37 connected between its output and its inverting input, and feedback resistors 38 and 39 connected between its output and its non-inverting input through capacitor 40. Preferably resistors 37 and 39 are potentiometers, for adjustment of frequency of the output signal of the oscillator. Connected in parallel with capacitor 40 is capacitor 41 in series with resistor 42. The inverting input of operational amplifier 35 is connected to a source of potential $-V_1$ through resistor 43, as is the junction of capacitor 41 and resistor 42. A source of potential $-V_2$, which is more negative than source of potential $-V_1$, is connected to source of potential $-V_1$ through series connected diodes 44 and 45, which have their anode terminals connected in the direction of the source of potential $-V_2$. The junction of the pair of diodes is connected to the junction of capacitors 40 and 41 through capacitor 46.

Connected to the output terminal of operational amplifier 35 is potentiometer 47, which is also connected to the source of potential $-V_1$. The control tap on potentiometer 47 is connected to the inverting input of operational amplifier 48 through resistor 49. The non-inverting input of operational amplifier 48 is connected to the source of potential $-V_1$. Feedback resistor 50 connects the output of operational amplifier 48 to its inverting input.

Turning briefly to FIG. 4, it will be noted that the two output leads of the apparatus are labelled RING 1 and RING 2. These leads are applied to the inputs of operational amplifier 51 (FIG. 3) through resistors 52 and 53. Feedback resistor 54 connects the output of operational amplifier 51 to its inverting input. The output of operational amplifer 51 is connected to the inverting input of operational amplifier 48 through resistor 55.

The output of operational amplifier 48 is connected to the input of the semiconductor switch 56, and also to the input of semiconductor switch 57 through an inverter. The inverter is comprised of operational amplifier 58 having input resistor 59 connected to its inverting input from the output of operational amplifier 48 and also having feedback resistor 60 connected between its output and its inverting input.

The output of semiconductor switches 56 and 57 together through respective series resistors 62 and 63, to a lead indicated as ERROR. Capacitor 64 is connected between the ERROR lead and souce of potential $-V_2$.

The output of switches 56 and 57 are also connected via leads indicated as EC1 and EC2 through individual resistors 69 and 70 together to the inverting input of operational amplifier 71. A voltage divider comprised of series resistors 73 and 74 is connected between sources of potential $-V_3$ and $-V_2$, with its tap to the noninverting input of operational amplifier 71.

The output of operational amplifier 71 is connected through resistor 172 to the noninverting input of operational amplifier 173, which input is also connected through resistor 174 to source of potential $-V_3$. The ERROR lead is connected to the inverting input.

The output of operational amplifier 173 is connected through diodes 175 and 176 to individual base electrodes of PNP transistors 75 and 76, and to source of potential $-V_3$ through resistor 177.

The output signal of the sine wave oscillator noted earlier is applied from the output terminal of operational amplifier 35 to the non-inverting input of comparator 65 and the inverting input of comparator 66. The inverting input of comparator 65 and the non-inverting input of comparator 66 are connected to the source of potential $-V_1$. The output of comparator 65 is connected to the gate of switch 56, and the output of comparator 66 is connected to the gate of semiconductor switch 57. The individual outputs of comparators 65 and 66 are connected to a source of potential $-V_3$ through individual resistors 67 and 68, and also individually through diodes 178 and 179 to respective base electrodes of transistors 75 and 76.

The respective base electrodes are connected to the source of potential $-V_3$ through individual resistors 77 and 78, and the collectors are connected to a more negative source of potential $-V_4$ (e.g. $-48$ volts) through individual resistors 79 and 80. The emitters of transistors 75 and 76 are individually connected to source of potential $-V_3$ through the series circuits of resistor 81 and light emitting diode 82 of an optocoupler, and resistor 83 and light emitting diode 84 of another optoisolator. The optocoupler will be described further below.

Turning to FIG. 4 a pair of leads carrying an overcurrent indication voltage (to be described in detail below) are individually connected to the inputs of operational amplifier 85 through resistors 86 and 87. The lead connected to the non-inverting input of operational amplifier 85 is connected to a source of potential $-V_1$ through resistor 88, while the inverting input is connected to the source of potential $-V_1$ through resistor 89.

The output of operational amplifier 85 is connected through resistor 90 to the base input of PNP transistor 91, which base is also connected to source of potential $-V_3$ through resistor 92; the emitter of transistor 91 is also connected to source of potential $-V_3$.

A triangular wave oscillator is provided, comprised of operational amplifier 96 having feedback resistor 97 connecting its output to its noninverting inpuut, which input is also connected to the source of potential $-V_1$ through resistor 98. Its ouput is connected to source of potential $-V_3$ through resistor 99. Its output is also connected to its inverting input through resistor 100, which input is also bypassed to source of potential $-V_2$, through capacitor 101. The junction of resistor 100 with the inverting input of operational amplifier 96 is connected to the noninverting input of operational amplifier 95. The ERROR lead (FIG. 3) is connected to the inverting input of operational amplifier 95.

The output of operational amplifier 95 is connected to the input of analog switch 93. The output of analog switch 93 is connected through resistor 94 to the base input of PNP transistor 102. The base of transistor 102 is connected through resistor 103 to source of potentional $-V_3$.

Transistor 102 is connected to PNP transistor 104 as a Darlington circuit, with the collector of transistor 102 connected to the base of transistor 104. Both of the emitters of transistors 102 and 104 are connected to source of potential $-V_3$. The base of transistor 104 is connected to source of potential $-V_2$ through resistor 105. The collectors of transistors 91 and 104 are connected together, and through resistor 109 to the base of transistor 111, and to source of potential $-V_4$ through resistor 110.

The output of the triangular wave oscillator operational amplifier 96 is connected to one of the inputs of a flip flop 106 which forms a divide by two circuit. The other input is connected to the output of the flip flop, which is also connnected to the gate of analog switch 93.

As noted earlier, the junction between the resistors 109 and 110 is connected to the base of NPN transistor 111, while the emitter of transistor 111 is connected to the source of potential $-V_4$. The collector of transistor 111 is connected to the source of potential $-V_3$ through resistor 112.

The collector of transistor 111 is also connected to the input of a Darlington switch power transistor 113 through resistor 114 in parallel with capacitor 115. The output of the Darlington switch 113 is connected to one lead of the primary winding 116 of an output transformer. The other lead of the primary winding is connected to source of potential $-V_3$ through resistor 117.

Resistors 86 and 87 are connected to the opposite terminals of resistor 117.

Another winding 118 of the same output transformer is wound bifilar with the primary winding, and is connected between the source of potential $-V_4$ and, through diode 119, the source of potential $-V_3$.

A secondary winding 120 of the transformer is connected to rectifier diode 121 which is in series with resistor 122. Resistor 122 is connected to a bistable flip flop switch as will be described below.

The flip flop switch is comprised of four sections, with pairs of sections being of similar construction. A first section is comprised of PNP transistor 123 having its base connected to its emitter through resistor 124. The base of transistor 123 is connected to the emitter of transistor 125, and the collector of transistor 123 is connected to the collector of transistor 125. The base of transistor 125 is connected to the emitter of transistor 123 through resistor 126. The anode of a diode 127 is connected to the collectors of transistors 123 and 125, and resistor 128 is connected to the base of transistor 125.

A similarly constructed section is made up of PNP transistors 129 and 130 corresponding to transistors 123 and 125 respectively, and resistors 131, 132, and 133 corresponding to resistors 124, 126 and 128 respectively, while diode 134 corresponds to diode 127. The circuits contain similarly valued components and the emitters of transistors 129 and 123 are connected together, and to resistor 122.

The two remaining circuit sections are also similar to each other in structure. The first is comprised of NPN transistors 135 and 136, the base of transistor 135 being connected to the emitter of transistor 136. Diode 137 is connected between the collectors of the two transistors, with its anode to the collector of transistor 135. Resistor 138 is connected between the base and emitter of transistor 135.

A phototransistor 139, the light sensitive element of one of the aforenoted optocouplers has its base connected to the base of transistor 136 through diodes 181 and 182, which base, is connected to the emitter of transistor 135 through resistor 140. Its emitter is connected to the base of transistor 136 through resistor 141, and its collector is connected to a source of direct current to be described below.

The last section is constructed similarly to that just described. Transistors 142 and 143 correspond to transistors 135 and 136 respectively, and resistors 144, 145 and 146 correspond to resistors 140, 138 and 141 respectively. Also diodes 183 and 184 correspond to diodes 181 and 182. The emitter of transistor 142 is connected to the emitter of transistor 135, and also to the lead of secondary winding 120 of the transformer which is not connected to diode 121.

The cathode of diode 127 is connected to the collector of transistor 135 through resistor 147 in series with diode 185 and the cathode of diode 134 is connected to the collector of transistor 142 through resistor 148 in series with diode 186. The junction between diode 185 and resistor 147 is connected to the emitter of transistor 135 through the series circuit of diode 187 and resistor 188, and the junction between diode 186 and resistor 148 is connected to the emitter of transistor 142 through the series circuit of diode 189 and resistor 190. Diodes 185 and 186 are connected in the same polarity sense as the emitter-collector junctions of transistors 135 and 136 respectively, and diodes 187 and 189 are connected in the opposite polarity sense.

The cathode of diode 127 is connected to the RING 1 output lead through resistor 149, while the cathode of diode 134 is connected to the output RING 2 lead through resistor 150. Opposite terminals of resistors 149 and 150 are connected together through capacitors 151 and 152.

The source of direct current noted above, for connection to collectors of transistors 139 and 160 is obtained by the provision of a tertiary winding 153 on the aforenoted transformer. One terminal of the tertiary winding is connected to the secondary winding 120, and the other terminal is connected to the anode of a rectifier diode 154. A filter capacitor 155 is connected from the cathode of diode 154 to the junction of the secondary and tertiary windings of the transformer. The junction of diode 154 and capacitor 155 is connected to both collectors of phototransistors 139 and 160 to supply operating current thereto.

Oppositely phased output signals are obtained on the RING 1 and RING 2 leads, whereby ringing signals are provided to the telephone system. These leads are also similarly noted and are connected to resistors 52 and 53 (FIG. 3) for output signal sampling.

Considering FIGS. 3 and 4 in conjunction, the circuit operates as follows. The sine wave oscillator including operational amplifier 35 is adjusted by means of potentiometers 37 and 39 to provide a 20 hertz reference signal at its output. Diodes 44 and 45 provide clamps for the circuit to maintain the oscillator output signal stable between the two voltage rails $-V_1$ and $-V_2$.

The output signal passes through potentiometer 47, by which amplitude is controlled.

The ringing generator output signal from the RING 1 and RING 2 leads is applied to operational amplifier 51 and appears at its output as a sine wave, assuming that the latter output signal is undistorted. The latter signal is applied, with the oscillator output signal, to the inverting input of operational amplifier 48. Potentiometer 47 is adjusted so that the two signals substantially cancel each other. Accordingly, there will be no output signal from operational amplifier 48.

However, in case of excess current draw from the RING 1 and RING 2 leads, the signal appearing thereacross would become distorted. A difference signal representing the distortion relative to the output signal of the aforenoted oscillator will thus appear at the output of operational amplifier 48. The difference signal is applied to the input of semiconductor switch 56, and also to the input of semiconductor switch 57 in opposite phase, after undergoing phase reversal in the buffer comprising operational amplifier 58. The two oppositely phased output signals appear on output leads EC1 and EC2 of switches 56 and 57 respectively after being gated through switches 56 and 57. After integration by resistors 62 and 63 with capacitor 67, the resulting signal appears on the ERROR lead.

The output signal of the oscillator is also applied to comparators 65 and 66 which are connected with opposite input polarity. Accordingly, the output signals thereof gate semiconductor switches 56 and 57 alternately, which converts the opposite polarity difference signals from operational amplifier 48 to single polarity at capacitor 64. The resulting integrated output signal is a d.c. voltage which varies with the output signal distortion, carried by the ERROR lead. This voltage is applied to the inverting input of comparator 95 (FIG. 4) and one input of operational amplifier 173 (FIG. 3).

The output signals of comparator 65 and 66, carrying the alternate phases of the original sine wave signal, are applied via diodes 178 and 179 to the inp;uts of the circuits comprising transistors 75 and 76. As a result, light emitting diodes 82 and 84 are alternately illuminated.

The signals on leads EC1 and EC2 which are in excess of a threshold set by voltage $-V_3$ are applied to operational amplifier 71 and the result is applied to operational amplifier 173. The integrated error signal on the ERROR lead is further applied to operational amplifier 173, which modifies the resulting duty cycle of illumination of light emitting diodes 82 and 84 by the relative amplitude of the integrated error signal and the timing of the error signals on lead EC1 and EC2.

A triangular wave oscillator of conventional construction which is comprised of operational amplifier 96 applies a preferably 20 kilohertz pulse signal to the noninverting input of comparator 95. During the early fast rising time of each hold cycle, the pulses are short and widely spaced; during the time at about the 90 degree phase time of each half cycle, the pulses are longer with shorter spaces therebetween. The resulting effect in comparator amplifier 95 is to vary the pulse widths in accordance with the 20 kilohertz sine wave and the ERROR signal. Where the ERROR signal is small, the duty cycle of each pulse is as originally noted, with only a small variation from a sine wave, with each half cycle inverted from the normal, made up of pulses at the 20 kilohertz rate. However, where the distortion is large, a larger error signal produces an increased or modified duty cycle of each pulse required to restore the output signal to normal, undistorted. Since comparator 95 is operated open loop, its gain is very high, and the output signal therefrom is a square wave.

The resulting square wave signal is applied to the input of semiconductor switch 93. The output of switch 93 is applied to the input of transistor 102, and appears at the collector of transistor 104. This signal, after subtracting the signal noted from the collector of transistor 91, is applied to the base input of transistor 111, following which it is applied to the input of the Darlington switch circuit 113, for application to the primary winding 116 of the transformer. The resulting signal is induced in secondary winding 120, and due to the operation of diode 121, appears as a full-wave rectified pulsing signal of single polarity. This signal is applied to the base terminals of transistors 125 and 130 through resistance voltage dividers, and also to the emitter of transistors 123 and 129.

However switch 93 is gated from the output of flip flop 106, which is driven from the output of the triangular wave oscillator. Flip flop 106 thus acts as a divide by 2 circuit, gating switch 93 every second triangular wave. This allows the modulation of the triangular wave signal translated through switch 93 to exceed 50%, and to approach 100%.

As noted earlier, the current drawn by the RING 1 and RING 2 leads passes through transformer winding 116 and resistor 117. The voltage developed across resistor 117 is translated by operational amplifier 85 after exceeding the threshold voltage set up by the voltage dividers at its input terminals, i.e. resistors 86 and 88, and 87 and 89. When this occurs, an output signal, amplified by transistor 91, is applied to the collector of transistor 104 in opposite polarity, subtracting from its output signal. The larger the voltage developed across resistor 117, the larger is the signal subtracting from the output signal of transistor 104.

As a subtracting signal is produced only when the input threshold of operational amplifier 85 is exceeded, this acts as an overcurrent protection circuit, which acts to reduce the amplitude of the output current should excess current be drawn over a predetermined current amplitude.

Continuing now with the description of the signal flow from the output of the transformer, upon conduction of transistors 125 and 130, transistors 123 and 129 also are caused to conduct, carrying the output current of secondary winding 120 of the transformer through their emitter-collector junctions.

Transistors 123 and 125 can conduct only when a through-path for the conduction of current exists to the terminal of secondary winding 120 opposite to the one to which diode 121 is connected. This conduction path exists through transistors 135 and 136, when those transistors operate. The base terminal operation path of transistor 136, which transistor turns on transistor 135, is enabled by phototransistor 139. Accordingly, when phototransistor 139 receives light from its corresponding optocoupled light emitting diode, the aforenoted conduction path is provided.

Similarly, a current operating conduction path from the collectors of transistors 129 and 130 will exist through diode 134 and transistors 143 and 142 to a lead of secondary winding 120 when phototransistor 160 is enabled by its optocoupled light emitting diode. Accordingly, upon operation of phototransistors 139 and 160 sequentially, transistor pairs 123 and 125, and 129 and 130 will alternately conduct.

Operation of the optocouplers is as follows. The output of the 20 hertz oscillator described earlier is applied from the output of operational amplifier 35 to the opposite polarity inputs of comparators 65 and 66. Each of the latter comparators conducts in alternate half cycles of the 20 hertz input signal. Accordingly transistors 75 and 76 are operated in alternate half cycles (except for modification of the timing by the error voltage, as described earlier), illuminating light emitting diodes 82 and 84 which are respectively coupled to phototransistors 139 and 160 in the aforenoted optocouplers. The RING 1 and RING 2 leads are thus driven in synchronization with the original 20 hertz oscillator described earlier.

The RING 1 lead is connected to the junction of diode 127 and resistor 147, and the RING 2 lead is connected to the junction of diode 134 and resistor 148. Accordingly, upon operation of phototransistor 139, the RING 1 lead is connected to a floating ground (at the emitter of transistor 135 through the collector-emitter circuit of transistor 135 and resistor 147 which should be of low resistance) while the RING 2 lead is connected to the output of diode 121 through transistor 129, and thus carries the signal voltage.

When phototransistor 160 operates, however, transistors 142 and 143 conduct, which connects the RING 2 lead to the secondary winding 120, as well as one terminal of resistor 128, of voltage divider resistors 126 and 128. This causes transistors 125 and 123 to conduct (but not transistors 135 and 136), which connects the RING 1 lead to the top signal carrying rail connected to the cathode of diode 121.

Accordingly, with sequential operation of phototransistors 139 and 160, the RING 1 lead and RING 2 leads are alternately connected to the bottom rail, and the opposite unconnected RING lead carries the signal at a level above the bottom rail. Accordingly, the RING 1 and RING 2 leads are alternately switched, and the previously noted effectively full-wave rectified signals are converted to full sine wave signals having each half cycle of opposite phase on each of the RING 1 and RING 2 leads.

Operating current is supplied to the phototransistors of the optocouplers by means of rectification and filtering in diode 154 and capacitor 155 from tertiary winding 153 of the transformer, one lead of which is also connected to the aforenoted bottom rail.

To operate the output switch circuits whereby an output signal on the RING 1 and RING 2 leads would be of sine wave form, the circuit including the transformer preferably is operated within a forward converter. Thus, winding 118 is wound bifilar with primary winding 116, and is connected in series with demagnetizing diode 119. The component selection requirements as well as the operation of a forward converter are believed to be well-known and thus will not be described in detail. This information is available from N.V. Phillip's Gloeilampenfabrieken, Eindhoven, Holland in a bulletin APPLICATION INFORMATION, Publication No. 474, entitled: "The Forward Converter In Switched-Mode Power Supplies" by C. van Velthooven, dated July 4, 1975.

The circuit described above thus provides means for dynamically varying the amount of ringing signal current supplied to a load as the current demands of the load vary, while keeping the waveform of optimal shape. The circuit acts to modify the duty cycle of a pulsing signal from which the output ringing signal is produced and thus the output energy, as demands of the load require.

A person skilled in the art understanding this invention may now conceive of other circuits or variations of the present circuit which will operate similarly or obtain similar ends, using the principles of the present invention. All such circuits or variations are considered within the sphere and scope of the present invention as defined in the appended claims.

I claim:
1. A ringing signal comprising:
   (a) means for providing a variable pulse width signal,
   (b) means for converting the variable pulse width signal to an output signal of the ringing signal supply at a ringing frequency,
   (c) means for monitoring the output signal of the ringing signal supply and for determining any variance of its waveshape from a predetermined waveshape,
   (d) means for varying the width of the pulses in the waveform of the variable pulse width signal in response to said variance so as to render said output signal to the form of said predetermined waveshape.
2. A ringing signal supply comprising:
   (a) a ringing frequency signal generator having an output;
   (b) a comparison circuit connected to the output of the signal generator, including means for receiving a further signal representative of an output signal of the ringing signal supply, for comparing an output signal of the signal generator with the output signal of the ringing signal supply and for producing an error signal related to the difference therebetween,
   (c) a pluse width modulator circuit for receiving the error signal, including means for producing a pulse signal which is pulse width modulated in response to the error signal, and
   (d) means for converting the pulse width modulated signal into said output signal of the ringing signal supply.
3. A ringing signal supply comprising:
   (a) a ringing frequency signal generator having an output,
   (b) a comparison circuit connected to the output of the signal generator, including means for receiving a further signal representative of an output signal of the ringing signal supply for comparing an output signal of the signal generator with the output signal of the ringing signal supply and for producing an error signal in response thereto,
   (c) a pluse width modulator circuit including means for receiving a high frequency triangular envelope signal and a smoothed representation of the error signal and for pulse width modulating the triangular envelope signal therewith,
   (d) means for supplying current through a transformer corresponding to the modulated triangular envelope signal, and
   (e) means for producing said output signal of the ringing signal supply from the transformer at the ringing frequency.
4. A ringing signal supply as defined in claim 3, in which the means for supplying current through the transformer is comprised of forward converter means.
5. A ringing signal supply as defined in claim 2, 3 or 4 further including overcurrent sensing means for sensing current corresponding to the level of current of said output signal, and for reducing the period of the pulse width modulated signal in the event the sensed current exceeds a predetermined level.
6. A ringing signal supply as defined in claim 2, 3 or 4 further including overcurrent sensing means for sensing current corresponding to the level of current of said output signal, and for reducing the amplitude of the pulse width modulated signal in the event the sensed current exceeds a predetermined level.
7. A ringing signal supply as defined in claim 3, in which the means for producing said output signal is comprised of a bistable current drive means having a pair of output current drive circuits each connected to an output lead, further comprising means for applying operating current alternately to each output current drive circuit during alternate half cycles at the ringing frequency, and means for applying said supply of current from the output of said transformer to the pair of output drive circuits.
8. A ringing supply as defined in claim 7, in which the time of applying operating current to each output current drive circuit is modified by the smoothed representation of the error signal whereby the output current drive circuits may both be operating simultaneously during part of the cycle of the output signal.
9. A ringing signal supply as defined in claim 6, in which the means for applying operating current alternately to each output current drive circuit is comprised of current switch means connected for enabling thereof to the output of optical isolator means, the input of each optical isolator means being alternately connected for operation to the output of the ringing frequency signal generator.

10. A ringing signal supply as defined in claim 7 or 8 further including a source of said operating current connected to the output current drive circuits, comprising a tertiary winding on said transformer, and rectifier and filter means connected in a circuit therewith for converting alternating current signals induced in said tertiary winding to direct current.

11. A ringing signal supply as defined in claim 3 or 9, in which the comparison circuit is comprised of an operational amplifier having an input for receiving both a ringing frequency signal from the ringing frequency signal generator and said further signal representative of the output signal of the ringing signal supply and for substracting the latter two signals to produce said error signal.

12. A ringing signal supply as defined in claim 3, 7 or 9 in which the comparison circuit is comprised of a differential amplifier having individual inputs for receiving signals from each said output lead, an operational amplifier having one input connected to the output of the differential amplifier and another to the output of the ringing frequency signal generator, means for inverting each alternate half cycle of the output signal of the operational amplifier under control of the ringing frequency signal generator, and means for integrating the resulting signal to produce said error signal.

* * * * *